L. P. LAW.
POTATO PEELER.

No. 179,705. Patented July 11, 1876.

Witnesses: Inventor:
Lewellyn P. Law

UNITED STATES PATENT OFFICE.

LEWELLYN P. LAW, OF CHICAGO, ILLINOIS, ASSIGNOR TO MOSES W. LESTER AND FRANKLIN LESTER, OF SAME PLACE.

IMPROVEMENT IN POTATO-PEELERS.

Specification forming part of Letters Patent No. 179,705, dated July 11, 1876; application filed August 7, 1874.

*To all whom it may concern:*

Be it known that I, LEWELLYN P. LAW, of Chicago, in the county of Cook and State of Illinois, have invented certain Improvements in Machines for Peeling Potatoes and other vegetables and fruits, of which the following is a specification:

This invention relates to a machine for removing the skin from potatoes or other vegetables or fruits.

Figures 1, 2:
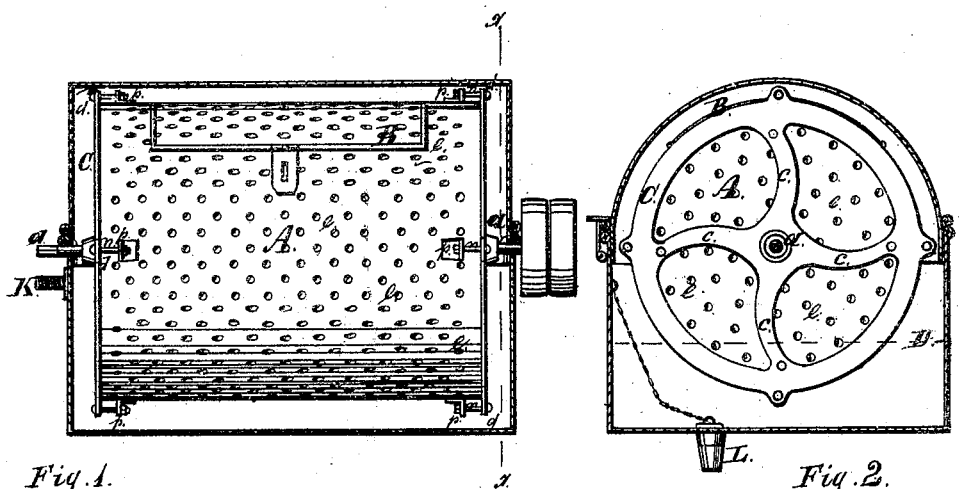
Figures 3, 4:
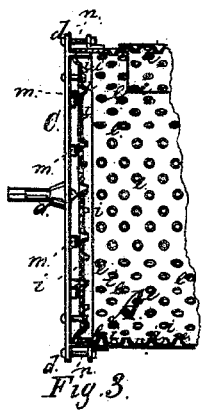

The nature of the invention will be fully understood from the following description and claims:

In the accompanying drawings, which form a part of this specification, Figure 1 represents a horizontal section of the casing and a top or plan view of the cylinder. Fig. 2 is a vertical section taken on the line $x\ x$ of Fig. 1. Fig. 3 is a vertical longitudinal section of one end of the cylinder. Fig. 4 is an inner-face view of one of the cylinder-head supports.

Like letters of reference indicate like parts in each figure.

In the said drawings, A represents the perforated sheet-metal cylinder mounted upon the trunnions $a\ a$, one of which may be fitted with a band-wheel, $b$, or, in lieu thereof, with a crank or any contrivance for giving a rotary motion to the cylinder. B is a door or opening, which may be of any desired size for admitting the vegetables to the interior of the cylinder. The whole surface of the cylinder is perforated with holes $e$ of sufficient size to allow the escape of the débris, the jagged edges $i$ of which project into the cylinder. The heads or ends are in like manner perforated.

The diameter of the cylinder should be great enough to insure a sufficient fall of the contents to cause the potatoes or vegetables to strike with considerable force as they are carried up, and fall back as the cylinder is rotated. I prefer to make it about two to three feet in diameter, more or less. The length, of course, is immaterial, but, as in a short cylinder I attain the benefit of the decorticating action of the heads to the same extent as in a long one, I prefer to make the cylinder comparatively short. The perforated sheet-metal sides and heads of the cylinder are supported by wheel-like frames C C at each end, which carry the trunnions $a\ a$. The wheels C are made with spokes or arms, so that the ends or heads of the cylinder shall be left free for the escape of matter through the perforations, and for the circulation of water. To better accomplish this, I provide the spokes $c\ c$ upon their inner face with the pyramidal projections $m$, which set against the head and keep it clear of the body of the spokes. The rim of the wheel may also be provided with these projections, as well as the spokes. These pyramidal points $m$ offer no material obstruction to the perforated head. The shoulders $d$ at the outer edge of the wheel serve to receive the edge of the cylinder, which is secured to the head-support by means of the bolts $n$ and eyes $p\ p$. By this construction I am enabled to remove and renew the perforated sheet-metal heads and sides when worn out.

K is a coupling-tube to receive a hose-pipe for the purpose of giving a constant supply of running water, which escapes at the plug L in the bottom.

The potatoes or vegetables to be peeled are placed in the cylinder, and the water is turned on, filling the casing to about the line D. The cylinder is then revolved at a reasonable speed, not so fast, however, that the potatoes, &c., shall be carried around with the cylinder, until the vegetables, by falling down against the points $i$, are peeled, which will not take very long.

The water, being agitated by the motion of the cylinder, circulates in and out at the perforations, and carries out all of the débris, and keeps the vegetables wet and in a proper condition to peel readily.

Vegetables, especially potatoes, are of various sizes, but in this machine the size of the vegetable makes no difference; the small ones peel as readily as the large ones, and a great saving is made on this account, as potatoes too small to be peeled with a knife may be peeled with a machine.

A great advantage of this machine, in addition to the saving of labor, is the saving in the material of the vegetable, as no more than the skin is taken off by the machine, while a knife or parer will also cut away considerable of the vegetable, and the most nutritious part—that immediately next the skin—is thus lost.

In peeling potatoes with the machine, it will only be necessary, after they have been subjected to the action of the cylinder, to cut out the eyes with a sharp-pointed knife, which is very quickly and easily done.

Having thus described my invention, I claim—

1. The combination of the perforated sheet-metal cylinder and the head-supporting wheels C, made with spokes $c$, and rim provided with projections $m$ and the trunnions $a$, substantially as specified.

2. The combination of the cylinder A, casing or trough, and the inlet-pipe K and plug L, for keeping the casing full of running water, as specified.

LEWELLYN P. LAW.

Witnesses:
JOHN W. MUNDAY,
HEINRICH F. BRUNS.